(12) United States Patent
Shiratake et al.

(10) Patent No.: US 11,306,180 B2
(45) Date of Patent: Apr. 19, 2022

(54) POLYCARBONATE AND MOLDED ARTICLE

(71) Applicant: MITSUBISHI GAS CHEMICAL COMPANY, INC., Tokyo (JP)

(72) Inventors: Munenori Shiratake, Ibaraki (JP); Kentaro Ishihara, Tokyo (JP); Koji Hirose, Tokyo (JP); Shinya Ikeda, Tokyo (JP); Noriyuki Kato, Tokyo (JP); Mitsuteru Kondo, Tokyo (JP); Shoko Suzuki, Tokyo (JP); Kensuke Oshima, Tokyo (JP); Shuya Nagayama, Tokyo (JP); Masahiro Kanda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 20 days.

(21) Appl. No.: 17/040,369

(22) PCT Filed: Mar. 8, 2019

(86) PCT No.: PCT/JP2019/009298
§ 371 (c)(1),
(2) Date: Sep. 22, 2020

(87) PCT Pub. No.: WO2019/188114
PCT Pub. Date: Oct. 3, 2019

(65) Prior Publication Data
US 2021/0054143 A1   Feb. 25, 2021

(30) Foreign Application Priority Data
Mar. 28, 2018 (JP) .............................. JP2018-061369

(51) Int. Cl.
*C08G 64/02* (2006.01)
*C08G 64/16* (2006.01)
*C08G 64/30* (2006.01)
*G02B 1/04* (2006.01)

(52) U.S. Cl.
CPC ..... *C08G 64/1608* (2013.01); *C08G 64/0208* (2013.01); *C08G 64/305* (2013.01); *G02B 1/041* (2013.01)

(58) Field of Classification Search
None
See application file for complete search history.

(56) References Cited

U.S. PATENT DOCUMENTS

| | | | |
|---|---|---|---|
| 10,048,404 B2 | 8/2018 | Kato et al. | |
| 10,689,487 B2 | 6/2020 | Hirakawa | |
| 2010/0104777 A1* | 4/2010 | Motoyoshi | C08G 64/1608 428/1.31 |
| 2010/0121018 A1 | 5/2010 | Yoshida et al. | |
| 2011/0298143 A1 | 12/2011 | Nunome et al. | |
| 2015/0285954 A1 | 10/2015 | Ishizuka et al. | |
| 2016/0319069 A1 | 11/2016 | Shigematsu et al. | |
| 2017/0240495 A1 | 8/2017 | Okanioto et al. | |
| 2017/0276837 A1 | 9/2017 | Kato et al. | |
| 2019/0033489 A1 | 1/2019 | Kato et al. | |
| 2019/0119442 A1 | 4/2019 | Hirakawa | |
| 2019/0241703 A1 | 8/2019 | Kato et al. | |
| 2019/0256524 A1 | 8/2019 | Sato et al. | |

(Continued)

FOREIGN PATENT DOCUMENTS

| | | |
|---|---|---|
| CN | 101679623 A | 3/2010 |
| CN | 102307930 A | 1/2012 |
| CN | 106029735 A | 10/2016 |

(Continued)

OTHER PUBLICATIONS

International Preliminary Report on Patentability issued in International Patent Application No. PCT/JP2019/009298, dated Sep. 29, 2020, along with an English translation thereof.
Sophie Lingier et al., "Rigid Polyurethanes, Polyesters, and Polycarbonates from Renewable Ketal Monomers", Macromolecules, vol. 50, No. 14, 2017,pp. 5346-5352.
Extended European Search Report dated Nov. 24, 2020 issued in the corresponding European Patent Application No. 19775953.3.
International Search Report issued in International Patent Application No. PCT/JP2019/009298, dated May 28, 2019, along with an English translation thereof.

*Primary Examiner* — David J Buttner
(74) *Attorney, Agent, or Firm* — Greenblum & Bernstein, P.L.C

(57) ABSTRACT

Provided are a polycarbonate having an appropriate refractive index and an appropriate Abbe number, and comprehensively excelling in heat resistance, total light transmittance, and hue, and a molded article thereof. The polycarbonate includes a constituent unit represented by Formula [I] and a constituent unit having a hydrocarbon group containing a cyclic structure. In Formula [I], $R^1$ and $R^2$ each independently denote a hydrocarbon group, and each $R^3$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

[I]

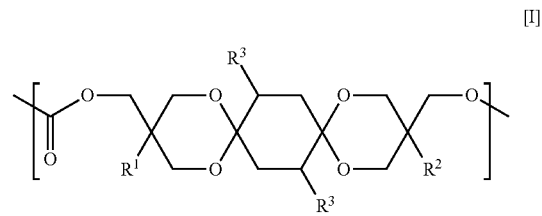

14 Claims, No Drawings

(56) References Cited

U.S. PATENT DOCUMENTS

2020/0354516 A1   11/2020   Kato et al.

FOREIGN PATENT DOCUMENTS

| CN | 106715374 A | 5/2017 |
|---|---|---|
| EP | 2 639 256 A1 | 9/2013 |
| EP | 3 202 757 A1 | 8/2017 |
| JP | 9-268225 A | 10/1997 |
| JP | 10-251500 A | 9/1998 |
| JP | 2006-232897 A | 9/2006 |
| JP | 2010-077249 A | 4/2010 |
| JP | 2011-162604 A | 8/2011 |
| WO | 2014/073496 A1 | 5/2014 |
| WO | 2016/052370 A1 | 4/2016 |
| WO | 2016/052476 A1 | 4/2016 |
| WO | 2017/175693 A1 | 10/2017 |
| WO | 2018/016516 A1 | 1/2018 |
| WO | 2018/074305 A1 | 4/2018 |

* cited by examiner

POLYCARBONATE AND MOLDED ARTICLE

TECHNICAL FIELD

The present invention relates to a polycarbonate and a molded article. In particular, the present invention relates to a molded article suitable for an optical lens.

BACKGROUND ART

Optical glass or optical resin is used as a material for optical lenses used in optical systems of various cameras such as cameras, film-integrated cameras, and video cameras. Optical glass excels in properties such as heat resistance, transparency, dimensional stability, and chemical resistance, but has problems such as high material costs, poor molding processability, and low productivity.

On the other hand, optical lenses made from optical resins are advantageous in that such optical lenses can be mass produced through injection molding. For example, polycarbonate resins and the like are used in lenses for cameras. In particular, resins for optical lenses having a high refractive index and a low Abbe number are being actively developed by creating thinner, lighter, and more compact products (Patent Document 1 and Patent Document 2). Furthermore, resins such as polymethyl methacrylate (PMMA) and cycloolefin polymer are commonly used as resins for optical lenses having a high Abbe number, and recently, resins for which various physical properties have been improved have also been used (Patent Document 3 and Patent Document 4).

Meanwhile, polycarbonates having a constituent unit derived from spiroglycol are also known (Patent Documents 5 to 9).

In general, when the refractive index of an optical material is high, a lens element having the same refractive index can be realized with a surface having a smaller curvature, and thus the amount of aberration generated at this surface can be reduced. As a result, the number of lenses can be reduced, the eccentricity sensitivity of the lens can be decreased, the lens thickness can be made thinner, and the lens can be made lighter.

With camera optical systems, aberration is ordinarily corrected by combining a plurality of concave lenses and convex lenses. In other words, the chromatic aberration produced by a convex lens can be synthetically canceled by combining the convex lens with a concave lens having a color aberration of a sign that is opposite that of the convex lens. When this is done, the concave lens must be highly dispersed (that is, the concave lens must have a low Abbe number).

CITATION LIST

Patent Documents

Patent Document 1: WO 2014/073496
Patent Document 2: WO 2018/016516
Patent Document 3: WO 2016/052370
Patent Document 4: WO 2017/175693
Patent Document 5: JP 2006-232897 A
Patent Document 6: JP 10-251500 A
Patent Document 7: JP 9-268225 A
Patent Document 8: JP 2011-162604 A
Patent Document 9: JP 2010-077249 A

SUMMARY OF INVENTION

Technical Problem

However, in recent years, the number of types of optical elements used in optical systems such as various types of cameras has further increased, and a demand has arisen for a resin for optical lenses having various balances between the refractive index and the Abbe number. Furthermore, in addition to appropriate refractive indexes and Abbe numbers, various other physical properties of the resin are also required.

Thus, an object of the present invention is to provide a polycarbonate that solves the problems described above, has an appropriate refractive index and an appropriate Abbe number, and excels comprehensively in heat resistance, total light transmittance, and hue, and to provide a molded article thereof.

Solution to Problem

On the basis of the problems described above, the present inventors discovered that the problems described above can be solved by using a polycarbonate obtained by copolymerizing dispiroglycol (DSG), which is a novel compound, and a dihydroxy compound having a hydrocarbon group containing a cyclic structure. Specifically, the problems described above are solved by the following means <1>, and preferably by the following means <2> to <14>.

<1> A polycarbonate including a constituent unit represented by Formula [I] below and constituent unit having a hydrocarbon group containing a cyclic structure:

[Chemical 1]

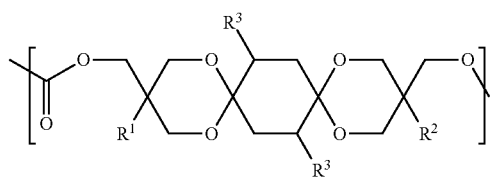

where $R^1$ and $R^2$ each independently denote a hydrocarbon group, and each $R^3$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

<2> The polycarbonate according to <1>, wherein the polycarbonate has a number average molecular weight of not less than 6000.

<3> The polycarbonate according to <1> or <2>, wherein the constituent unit represented by Formula [I] accounts for from 5 mol % to 95 mol % of all constituent units constituting the polycarbonate.

<4> The polycarbonate according to any one of <1> to <3>, wherein the constituent unit having a hydrocarbon group containing a cyclic structure includes a constituent unit represented by Formula [II]:

[Chemical 2]

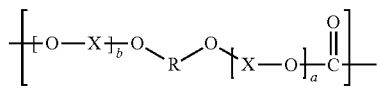

where a and b each independently denote an integer from 0 to 10, X denotes an alkylene group having from 1 to 8 carbon atoms, a cycloalkylene group having from 5 to 12 carbon atoms, or an arylene group having from 6 to 20 carbon atoms, and R denotes a hydrocarbon group containing a cyclic structure.

<5> The polycarbonate according to <4>, wherein a and b in Formula [II] are integers from 1 to 10.

<6> The polycarbonate according to <4> or <5>, wherein R in Formula [II] is a structure containing four or more benzene rings.

<7> The polycarbonate according to <4> or <5>, wherein the constituent unit represented by Formula [II] is at least one type of constituent unit represented by Formula [II-1], Formula [II-2], and Formula [II-3]:

[Chemical 3]

[II-1]

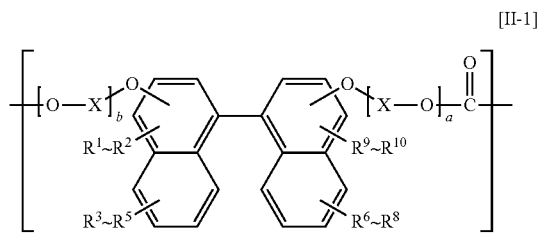

in Formula [II-1], $R^1$ to $R^{10}$ each independently denote a hydrogen atom, a fluorine atom, a chlorine atom, a bromine atom, an iodine atom, an alkyl group having from 1 to 6 carbon atoms, an aryl group having from 6 to 20 carbon atoms, an alkenyl group having from 2 to 6 carbon atoms, an alkoxy group having from 1 to 6 carbon atoms, or an aralkyl group having from 7 to 17 carbon atoms;

X denotes an alkylene group having from 1 to 8 carbon atoms, a cycloalkylene group having from 5 to 12 carbon atoms, or an arylene group having from 6 to 20 carbon atoms; and a and b are each independently an integer from 0 to 10;

[Chemical 4]

[II-2]

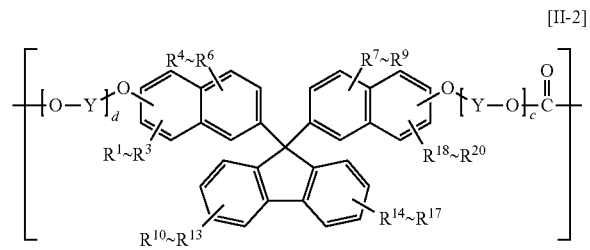

in Formula [II-2], R to $R^{20}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Y denotes an alkylene group having from 1 to 8 carbon atoms, a cycloalkylene group having from 5 to 12 carbon atoms, or an arylene group having from 6 to 20 carbon atoms; and c and d are each independently an integer from 0 to 10;

[Chemical 5]

[II-3]

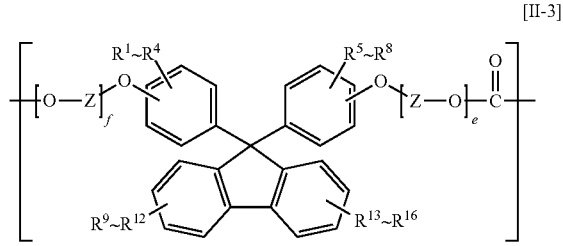

in Formula [II-3], $R^1$ to $R^{16}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Z denotes an alkylene group having from 1 to 8 carbon atoms, a cycloalkylene group having from 5 to 12 carbon atoms, or an arylene group having from 6 to 20 carbon atoms; and e and f are each independently an integer from 0 to 10.

<8> The polycarbonate according to any one of <1> to <7>, wherein each $R^3$ in Formula [1] is independently a hydrogen atom or a methyl group.

<9> The polycarbonate according to any one of <1> to <8>, wherein $R^1$ and $R^2$ in Formula [1] each independently denote a linear alkyl group having from 1 to 7 carbon atoms, a branched alkyl group having from 3 to 7 carbon atoms, or an aryl group.

<10> The polycarbonate according to any one of <1> to <8>, wherein $R^1$ and $R^2$ in Formula [I] are each independently a linear alkyl group having from 1 to 7 carbon atoms or an aryl group.

<11> The polycarbonate according to any one of <1> to <7>, wherein $R^3$ in Formula [I] is a hydrogen atom, and $R^1$ and $R^2$ are each independently an ethyl group, a methyl group, or a phenyl group.

<12> The polycarbonate according to any one of <1> to <7>, wherein $R^3$ in the Formula [I] is a hydrogen atom, and $R^1$ and $R^2$ are an ethyl group.

<13> A molded article including the polycarbonate described in any one of <1> to <12>.

<14> The molded article according to <13>, the molded article being an optical lens.

Advantageous Effects of Invention

According to the present invention, a polycarbonate having an appropriate refractive index and an appropriate Abbe number, and comprehensively excelling in heat resistance, total light transmittance, and hue, and a molded article thereof can be provided.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

The polycarbonate of the present invention is characterized by containing a constituent unit represented by Formula [I] below and a constituent unit having a hydrocarbon group containing a cyclic structure.

[Chemical 6]

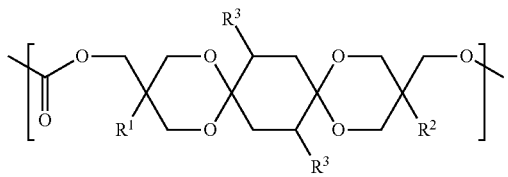

[I]

In Formula [I], $R^1$ and $R^2$ each independently denote a hydrocarbon group, and each $R^3$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

By configuring in this manner, a polycarbonate having an appropriate refractive index and an appropriate Abbe number and comprehensively excelling in heat resistance, total light transmittance, and hue can be obtained.

In particular, a high refractive index polycarbonate is obtained while maintaining an Abbe number equivalent to that of a polycarbonate derived from a spiroglycol monomer having a structure similar to that of DSG. In addition, such a polycarbonate excels in heat resistance and has a high total light transmittance and excellent hue (b value).

Constituent Unit Represented by Formula [I]

The polycarbonate of the present invention includes a constituent unit represented by Formula [I].

[Chemical 7]

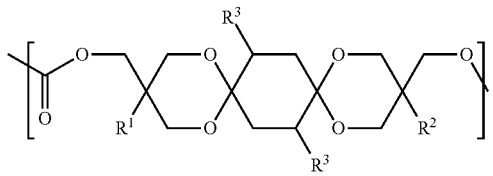

[I]

In Formula [I], $R^1$ and $R^2$ each independently denote a hydrocarbon group, and each $R^3$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

$R^1$ and $R^2$ in General Formula [I] each independently denote a hydrocarbon group, and preferably a linear alkyl group having from 1 to 7 carbon atoms, a branched alkyl group having from 3 to 7 carbon atoms or an aryl group, more preferably a linear alkyl group having from 1 to 7 carbon atoms or an aryl group, and even more preferably a linear alkyl group having from 1 to 7 carbon atoms.

An example of a preferred embodiment of $R^1$ and $R^2$ in the present invention is an ethyl group, a methyl group, or a phenyl group.

The linear alkyl group having from 1 to 7 carbon atoms is preferably a linear alkyl group having from 1 to 5 carbon atoms, more preferably a linear alkyl group having from 1 to 3 carbon atoms, and even more preferably a methyl group or an ethyl group.

The branched alkyl group having from 3 to 7 carbon atoms is preferably a branched alkyl group having from 3 to 5 carbon atoms, more preferably a branched alkyl group having 3 or 4 carbon atoms, and even more preferably a branched alkyl group having 3 carbon atoms.

The aryl group is preferably an aryl group having from 6 to 20 carbon atoms, more preferably an aryl group having from 6 to 14 carbon atoms, and even more preferably a phenyl group, a naphthyl group, or an anthracenyl group, and a phenyl group is yet even more preferable.

$R^1$ and $R^2$ in Formula [I] are respectively independent, and examples thereof include a methyl group, ethyl group, n-propyl group, isopropyl group, n-butyl group, 1-methylpropyl group, 2-methylpropyl group, 1,1-dimethyl ethyl group (tert-butyl group), n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group (neopentyl group), n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, 1,1,2-trimethyl propyl group, 1,2,2-trimethylpropyl group, 1-ethyl-1-methylpropyl group, 1-ethyl-2-methylpropyl group, n-heptyl group, 1-methylhexyl group, 2-methylhexyl group, 3-methylhexyl group, 4-methylhexyl group, 5-methylhexyl group, 1,1-dimethylpentyl group, 1,2-dimethylpentyl group, 1,3-dimethylpentyl group, 1,4-dimethylpentyl group, 1,5-dimethylpentyl group, 2,2-dimethylpentyl group, 2,3-dimethylpentyl group, 2,4-dimethylpentyl group, 3,3-dimethylpentyl group, 3,4-dimethylpentyl group, 4,4-dimethylpentyl group, 1-ethylpentyl group, 2-ethylpentyl group, 3-ethylpentyl group, 1-propylbutyl group, 2-propylbutyl group, 3-propylbutyl group, 1-ethyl-1-methylbutyl group, 1-ethyl-2-methylbutyl group, 1-ethyl-3-methylbutyl group, 2-ethyl-1-methylbutyl group, 2-ethyl-2-methylbutyl group, 2-ethyl-3-methylbutyl group, 1,2,3-trimethylbutyl group, phenyl group, naphthyl group, and anthracenyl group.

Among these, $R^1$ and $R^2$ are each independently more preferably a methyl group, an ethyl group, an n-propyl group, an isopropyl group, an n-butyl group, or a phenyl group, even more preferably a methyl group, an ethyl group, or a phenyl group, yet even more preferably a methyl group or an ethyl group, and yet even more preferably an ethyl group.

Each $R^3$ in Formula [I] independently denotes a hydrogen atom, a heteroatom-containing group, a halogen atom-containing group (preferably, a halogen atom), a linear alkyl group having from 1 to 6 carbon atoms, a branched alkyl group having from 3 to 6 carbon atoms, or a group including an aryl group and having from 6 to 12 carbon atoms; and is preferably a hydrogen atom, a linear alkyl group having from 1 to 6 carbon atoms, a branched alkyl group having from 3 to 6 carbon atoms, or a group including an aryl group and having from 6 to 12 carbon atoms, is more preferably a hydrogen atom, a linear alkyl group having from 1 to 6 carbon atoms, or a branched alkyl group having from 3 to 6 carbon atoms, is even more preferably a hydrogen atom or a methyl group, and is yet even more preferably a hydrogen atom.

Examples of the heteroatom included in the heteroatom-containing group include an oxygen atom, a sulfur atom, and a nitrogen atom.

Preferable examples of the heteroatom-containing group include alkoxy groups, alkyl thioether groups, amino groups, and nitro groups. In addition, the alkyl chain constituting the alkoxy group or the alkyl thioether group is preferably a linear alkyl chain having from 1 to 6 carbon atoms, and is more preferably a linear alkyl chain having from 1 to 3 carbon atoms.

The linear alkyl group having from 1 to 6 carbon atoms is preferably a linear alkyl group having from 1 to 5 carbon atoms, more preferably a linear alkyl group having from 1 to 3 carbon atoms, and even more preferably a methyl group or an ethyl group.

The branched alkyl group having from 3 to 6 carbon atoms is preferably a branched alkyl group having from 3 to 5 carbon atoms, more preferably a branched alkyl group having 3 or 4 carbon atoms, and even more preferably a branched alkyl group having 3 carbon atoms.

The group including an aryl group and having from 6 to 12 carbon atoms is preferably a phenyl group or an alkyl group substituted with a phenyl group, and is more preferably a phenyl group. The number of carbon atoms of the alkyl group constituting the alkyl group substituted with a phenyl group is preferably from 1 to 3, more preferably 1 or 2, and even more preferably 1.

Examples of $R^3$ in Formula [I] include a hydrogen atom, a methyl group, ethyl group, n-propyl group, isopropyl group, n-butyl group, 1-methylpropyl group, 2-methylpropyl group, 1,1-dimethyl ethyl group (tert-butyl group), n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group (neopentyl group), n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, 1,1,2-trimethyl propyl group, 1,2,2-trimethylpropyl group, 1-ethyl-1-methylpropyl group, 1-ethyl-2-methylpropyl group, a fluorine atom, chlorine atom, bromine atom, iodine atom, methoxy group, ethoxy group, propyloxy group, butoxy group, methyl thioether group, ethyl thioether group, amino group, nitro group, phenyl group, and benzyl group.

Among these, $R^3$ is more preferably a hydrogen atom, a methyl group, an ethyl group, an n-propyl group, an isopropyl group, or an n-butyl group. Furthermore, from the perspective of ease of industrial procurement, $R^3$ is particularly preferably a hydrogen atom.

An example of a preferred embodiment of the constituent unit represented by Formula [I] is an aspect in which $R^1$ and $R^2$ in Formula [I] are each independently an ethyl group, a methyl group, or a phenyl group, and $R^3$ is a hydrogen atom. Another example of a preferred embodiment of the constituent unit represented by Formula [I] is a constituent unit in which $R^1$ and $R^2$ in [1] are each independently an ethyl group or a methyl group, and $R^3$ is a hydrogen atom.

The constituent unit represented by Formula [I] is derived from a compound (hereinafter, also referred to as "DSG") represented by Formula [I-1] below.

[Chemical 8]

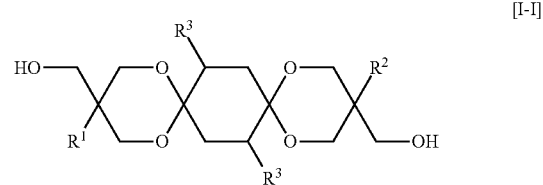

[I-1]

In Formula [I-1], $R^1$, $R^2$, and $R^3$ are synonymous with $R^1$, $R^2$, and $R^3$ in Formula [I], and the preferred ranges are also the same.

Compounds represented by Formula [I-1] and preferably used in the present invention are presented below. Of course, the present invention is not limited to these compounds. Note that Me denotes a methyl group, Et denotes an ethyl group, Pr denotes a propyl group, and Bu denotes a butyl group.

[Chemical 9]

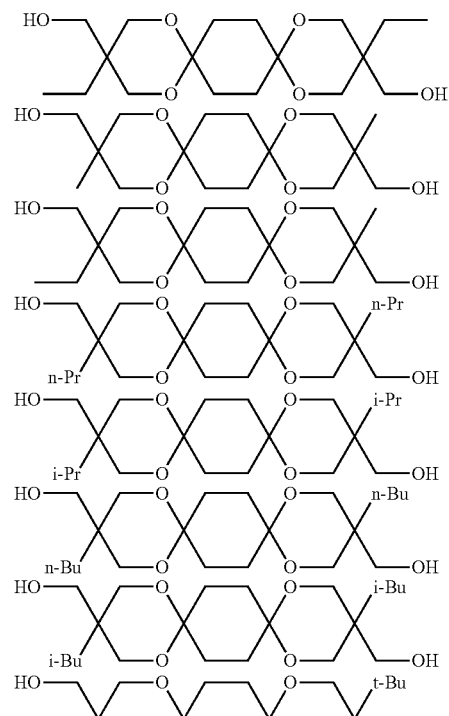

[Chemical 10]

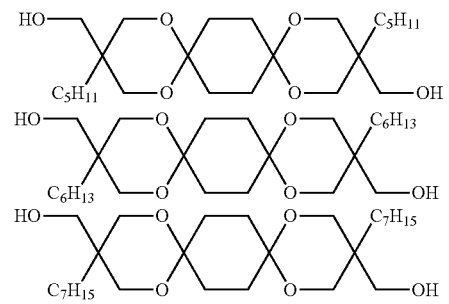

-continued
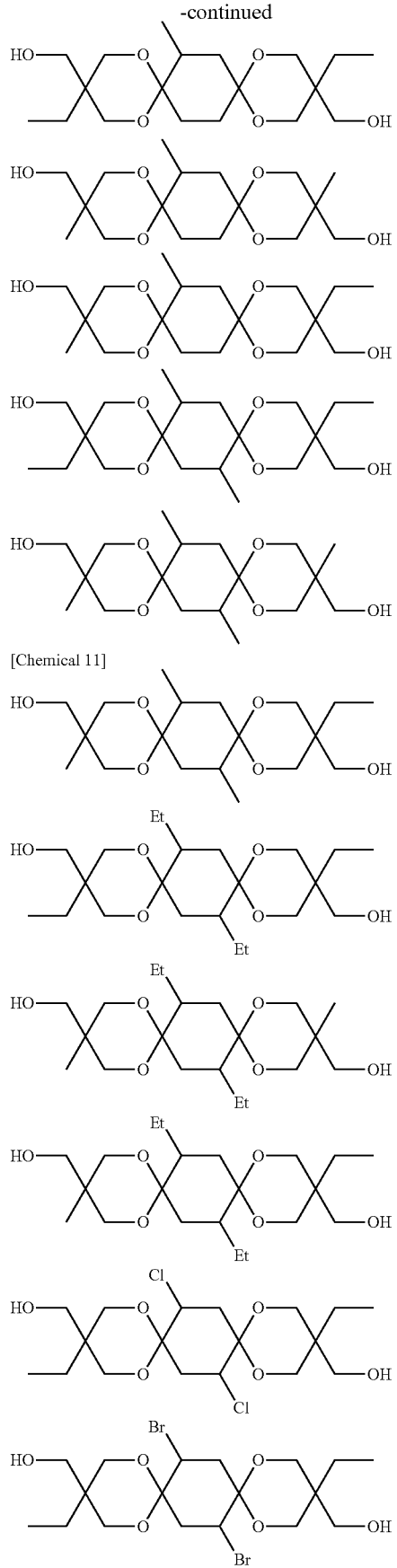
[Chemical 11]
-continued
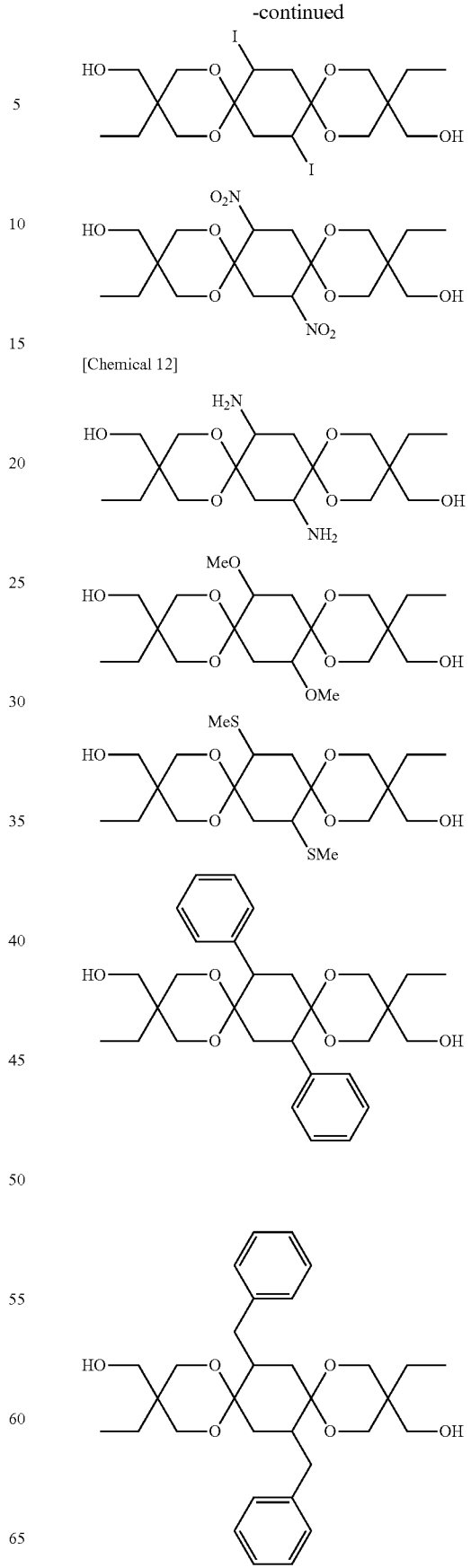
[Chemical 12]

[Chemical 13]

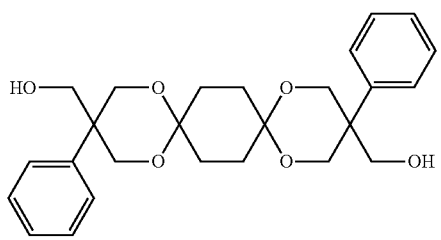

The molecular weight of the diol represented by Formula [I-1] is preferably from 300 to 550, and more preferably from 300 to 500.

The diol represented by Formula [I-1] is obtained by subjecting a 1,4-cyclohexanedione derivative represented by Formula (2) below and a triol represented by Formula (3) below to a cyclodehydration reaction. One type of the 1,4-cyclohexanedione derivative represented by Formula (2) and of the triol represented by Formula (3) may be used alone, or two or more types thereof may be used.

[Chemical 14]

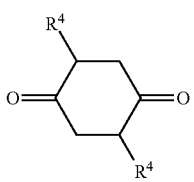

(2)

In Formula (2), each $R^4$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

The $R^4$ in Formula (2) is synonymous with the $R^3$ in Formula [I-1], and the preferred range is also the same.

[Chemical 15]

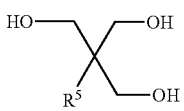

(3)

In Formula (3), $R^5$ denotes a hydrocarbon group.

Examples of the hydrocarbon group of $R^5$ include a linear alkyl group having from 1 to 7 carbon atoms, a branched alkyl group having from 3 to 7 carbon atoms, or an aryl group. In one embodiment, $R^5$ denotes a linear alkyl group having from 1 to 7 carbon atoms or a branched alkyl group having from 3 to 7 carbon atoms. However, the hydrocarbon group as $R^5$ does not contain an ether bond.

The $R^5$ in Formula (3) is synonymous with $R^1$ and $R^2$ in Formula [I-1], and the preferred range is the same.

In the present invention, a particularly preferable case is one in which the 1,4-cyclohexanedione derivative represented by Formula (2) is 1,4-cyclohexanedione, and the triol represented by Formula (3) is at least one of trimethylol-propane, trimethylolethane, or tris(hydroxymethyl)toluene (preferably, at least one of trimethylolpropane or trimethylolethane).

The proportion of the constituent unit represented by Formula [1] in the polycarbonate of the present invention is preferably 5 mol % or more of all the constituent units constituting the polycarbonate, and may be 10 mol % or more, 20 mol % or more, 30 mol % or more, or 40 mol % or more. Furthermore, the upper limit of the proportion of the constituent unit represented by Formula [I] is preferably not more than 95 mol %, more preferably not more than 70 mol %, and even more preferably not more than 60 mol %, of all the constituent units constituting the polycarbonate.

The polycarbonate of the present invention may contain only one type of the constituent unit represented by Formula [I] or may include two or more types thereof. In a case where two or more types thereof are contained therein, the total amount is preferably within the range described above.

Constituent Unit Having a Hydrocarbon Group Containing a Cyclic Structure

The polycarbonate of the present invention includes a constituent unit having a hydrocarbon group containing a cyclic structure.

A "hydrocarbon group containing a cyclic structure" refers to a group that includes a cyclic structure and has a skeleton that is formed from a hydrocarbon. More specifically, examples of the hydrocarbon group containing a cyclic structure include a hydrocarbon group of a cyclic structure which may have a substituent, and a group obtained by combining a hydrocarbon group of a cyclic structure that may have a substituent, and a hydrocarbon group having an acyclic structure that may have a substituent.

The cyclic structure of the present invention is a cyclic structure containing an aromatic ring and/or an alicyclic ring, and examples thereof include a single ring, a fused ring in which two or more single rings are fused, and a structure in which two or more single rings and/or fused rings are bonded through a covalent bond or a linking group (hydrocarbon group).

The constituent unit having a hydrocarbon group containing a cyclic structure preferably includes a constituent unit represented by Formula [11].

[Chemical 16]

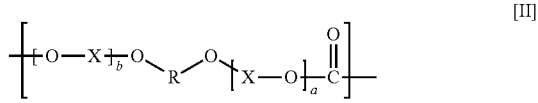

[II]

In Formula [II], a and b each independently denote an integer from 0 to 10, X denotes an alkylene group having from 1 to 8 carbon atoms, a cycloalkylene group having 5 to 12 carbon atoms, or an arylene group having from 6 to 20 carbon atoms, and R denotes a hydrocarbon group containing a cyclic structure.

In Formula [II], a and b are each independently preferably an integer from 1 to 10, more preferably an integer from 1 to 3, and even more preferably 1.

X in Formula [II] denotes an alkylene group having from 1 to 8 carbon atoms, a cycloalkylene group having from 5 to 12 carbon atoms, or an arylene group having from 6 to 20 carbon atoms, preferably an alkylene group having from 1 to 8 carbon atoms, more preferably an alkylene group having from 1 to 4 carbon atoms, and even more preferably an ethylene group. The alkylene group is a linear or branched alkylene group, and a linear alkylene group is preferable.

When a and b are 2 or more, each X may be the same or different.

R in Formula [II] denotes a hydrocarbon group containing a cyclic structure.

R is preferably a group including a linear alkylene group-cyclic structure-linear alkylene group, or is including a cyclic structure.

When R is a group including a linear alkylene group-cyclic structure-linear alkylene group, the linear alkylene group is an alkylene group having from 1 to 3 carbon atoms, and is preferably a methylene group or an ethylene group, and more preferably an ethylene group.

When R includes a cyclic structure, R may be an alicyclic or aromatic ring. Specific examples include a cyclic structure Cy illustrated below or a structure in which a substituent is bonded to the cyclic structure Cy.

Specific examples of the cyclic structure in the present invention include the following cyclic structures Cy.

Cyclic Structure Cy

[Chemical 17]

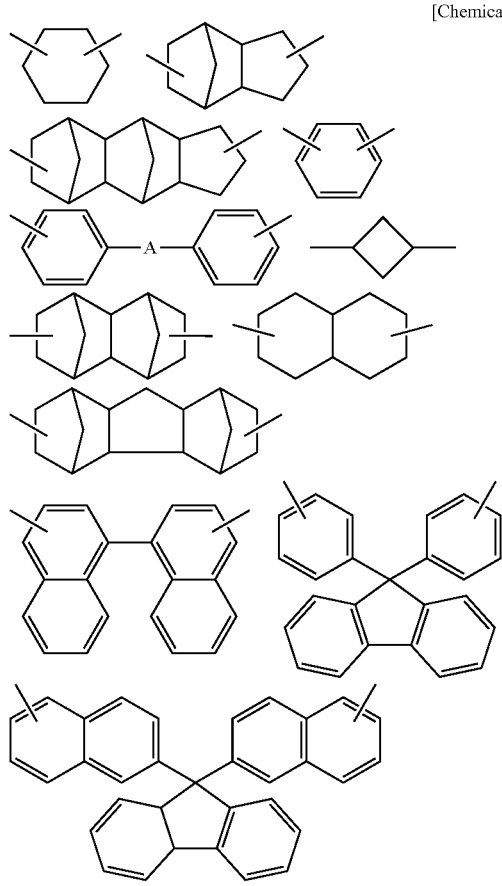

In the formulas above, A is a single bond or an alkyl group. Additionally, an aspect in which a substituent is bonded to the above-mentioned cyclic structure is also a preferable example of the cyclic structure of the present invention.

As described above, the hydrocarbon group having a cyclic structure of the present invention may have a substituent.

Examples of the substituent include hydrocarbon groups (alkyl groups having from 1 to 6 carbon atoms, aryl groups having from 6 to 20 carbon atoms, alkenyl groups having from 2 to 6 carbon atoms, or aralkyl groups having from 7 to 17 carbon atoms), and groups containing a halogen atom (for example, a fluorine atom, chlorine atom, bromine atom, or iodine atom), and groups containing a heteroatom (for example, an oxygen atom, nitrogen atom, or sulfur atom, and preferably an oxygen atom). Examples of groups containing a heteroatom include a group that is formed from a combination of a heteroatom and a hydrocarbon group, and alkoxy groups are preferable.

The constituent unit having a hydrocarbon group containing a cyclic structure preferably includes at least one constituent unit represented by Formula [11-1], Formula [II-2], or Formula [11-3].

[Chemical 18]

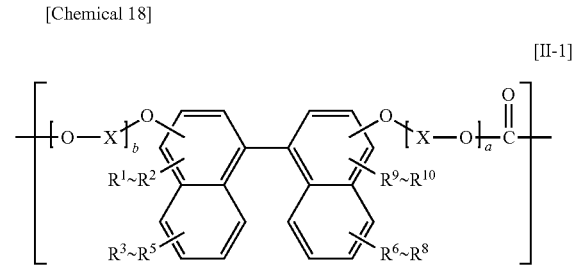

[II-1]

In Formula [11-1], $R^1$ to $R^{10}$ each independently denote a hydrogen atom, a fluorine atom, a chlorine atom, a bromine atom, an iodine atom, an alkyl group having from 1 to 6 carbon atoms, an aryl group having from 6 to 20 carbon atoms, an alkenyl group having from 2 to 6 carbon atoms, an alkoxy group having from 1 to 6 carbon atoms, or an aralkyl group having from 7 to 17 carbon atoms;

X denotes an alkylene group having from 1 to 8 carbon atoms, a cycloalkylene group having from 5 to 12 carbon atoms, or an arylene group having from 6 to 20 carbon atoms; and a and b are each independently an integer from 0 to 10;

[Chemical 19]

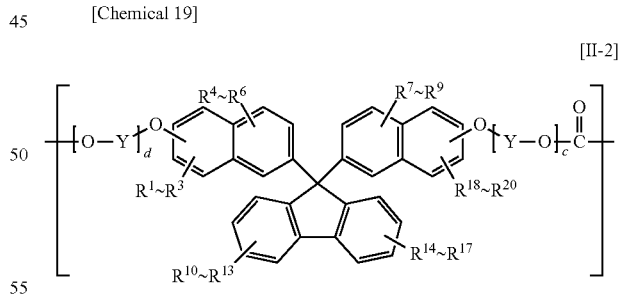

[II-2]

In Formula [II-2], $R^1$ to $R^{20}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Y denotes an alkylene group having from 1 to 8 carbon atoms, a cycloalkylene group having from 5 to 12 carbon atoms, or an arylene group having from 6 to 20 carbon atoms; and c and d are each independently an integer from 0 to 10;

[Chemical 20]

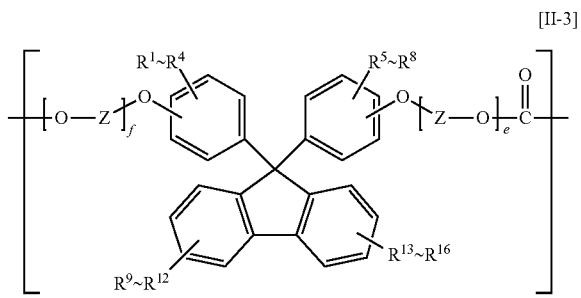

[II-3]

In Formula [II-3], $R^1$ to $R^{16}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Z denotes an alkylene group having from 1 to 8 carbon atoms, a cycloalkylene group having from 5 to 12 carbon atoms, or an arylene group having from 6 to 20 carbon atoms; and e and f are each independently an integer from 0 to 10.

In Formula [II-1], $R^1$ to $R^{10}$ each independently denote a hydrogen atom, a fluorine atom, a chlorine atom, a bromine atom, an iodine atom, an alkyl group having from 1 to 6 carbon atoms, an aryl group having from 6 to 20 carbon atoms, an alkenyl group having from 2 to 6 carbon atoms, an alkoxy group having from 1 to 6 carbon atoms, or an aralkyl group having from 7 to 17 carbon atoms, and a hydrogen atom, a fluorine atom, a chlorine atom, or an alkyl group having from 1 to 6 carbon atoms is preferable, a hydrogen atom, a fluorine atom, a chlorine atom, a methyl group, or an ethyl group is more preferable, a hydrogen atom or a methyl group is even more preferable, and a hydrogen atom is yet even more preferable.

In Formula [11-1], X denotes an alkylene group having from 1 to 8 carbon atoms, a cycloalkylene group having from 5 to 12 carbon atoms, or an arylene group having from 6 to 20 carbon atoms, and an alkylene group having from 1 to 8 carbon atoms is preferable, an alkylene group having from 1 to 4 carbon atoms is more preferable, and an ethylene group is even more preferable.

In Formula [11-1], a and b are each independently preferably an integer from 1 to 10, more preferably an integer from 1 to 3, and even more preferably 1.

Preferable ranges of $R^1$ to $R^{20}$ in Formula [II-2] and $R^1$ to $R^{16}$ in Formula [II-3] are the same as the preferable ranges of $R^1$ to $R^{10}$ in Formula [II-1].

The preferable ranges of Y in Formula [II-2] and Z in Formula [II-3] are the same as the preferable ranges of X in Formula [II-1].

The preferable ranges of c and d in Formula [II-2] and e and f in Formula [II-3] are the same as the preferable ranges for a and b in Formula [II-1].

The constituent units represented by Formula [II-1], Formula [II-2], and Formula [II-3] can be formed using the dihydroxy compound described in paragraphs [0035] to [0063] of WO 2018/016516, the contents of which are incorporated by reference herein.

The constituent unit having a hydrocarbon group containing a cyclic structure in the polycarbonate of the present invention preferably accounts for 5 mol % or more, more preferably 30 mol % or more, and even more preferably 40 mol % or more, of all the constituent units constituting the polycarbonate. Furthermore, the upper limit of the proportion of the constituent unit having a hydrocarbon group containing a cyclic structure is preferably not more than 95 mol % of all the constituent units constituting the polycarbonate, and may be 90 mol % or less, 80 mol % or less, 70 mol % or less, or 60 mol % or less.

In particular, preferably 80 mol % or more, and more preferably 90 mol % or more of the constituent units having a hydrocarbon group containing a cyclic structure are constituent units represented by Formula [II] (preferably, at least one type of constituent unit represented by Formula [II-1], Formula [11-2], or Formula [I1-3]). The polycarbonate of the present invention may contain only one type of constituent unit having a hydrocarbon group containing a cyclic structure, or may include two or more types thereof. In a case where two or more types thereof are contained therein, the total amount is preferably within the range described above.

Other Constituent Units

In the polycarbonate of the present invention, the total of the constituent units represented by Formula [1] and the constituent units having a hydrocarbon group containing a cyclic structure is preferably 90 mol % or more, more preferably 95 mol % or more, even more preferably 97 mol % or more, and yet even more preferably 99 mol % or more.

Meanwhile, the polycarbonate of the present invention may contain other constituent units besides the constituent units represented by Formula [I] and the constituent units having a hydrocarbon group containing a cyclic structure.

Examples of other constituent units include constituent units derived from aliphatic dihydroxy compounds, constituent units derived from compounds having three or more hydroxy groups, and constituent units derived from a dicarboxylic acid or derivative thereof.

When the polycarbonate of the present invention contains other constituent units, the other constituents are preferably included in a range from 10 to 49 mol %, and more preferably in a range from 10 to 30 mol %, of all the constituent units constituting the polycarbonate.

The other constituent unit may be only one type or may be two or more types. In a case where two or more types of other constituent units are contained therein, the total amount is preferably within the range described above.

An example of an embodiment of another constituent unit is an aspect having a constituent unit derived from an aliphatic dihydroxy compound. Specific examples of aliphatic dihydroxy compounds include 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornene dimethanol, tricyclodecane dimethanol, pentacyclododecane dimethanol, trimethylene glycol, 1,4-butanediol, 1,5-pentanediol, 1,6-hexanediol, diethylene glycol, propylene glycol, and neopentyl glycol.

When the polycarbonate of the present invention includes a constituent unit derived from an aliphatic dihydroxy compound, the content is preferably within a range from 10 to 49 mol %, and more preferably within a range from 10 to 30 mol %, of all the constituent units constituting the polycarbonate. The constituent unit derived from an aliphatic dihydroxy compound may be only one type or may be two or more types. In a case where two or more types thereof are contained, the total amount is preferably within the range described above.

Physical Properties of the Polycarbonate

The polycarbonate of the present invention may have a low molecular weight (a polycarbonate oligomer) or may have a high molecular weight (polycarbonate copolymer or polycarbonate resin). In the present invention, the polycarbonate is preferably a polymer.

The viscosity average molecular weight (Mv) of the polycarbonate of the present invention is preferably 5000 or more, more preferably 8000 or more, even more preferably 10000 or more, and yet even more preferably 11000 or more. The upper limit of the viscosity average molecular weight is, for example, not more than 100000, preferably not more than 50000, more preferably not more than 30000, even more preferably not more than 20000, yet even more preferably not more than 15000, still even more preferably not more than 13000, and even more preferably not more than 12000. By setting the viscosity average molecular weight to the above-mentioned lower limit or higher, the strength of the obtained molded article tends to be higher, and by setting the viscosity average molecular weight to the above-mentioned upper limit or lower, the melt viscosity decreases, it becomes easier to extract the molded article from a mold when the polycarbonate is molded by injection molding, and there is a tendency for fluidity to be improved and for achieving better injection moldability, which is preferable.

In addition, the number average molecular weight (Mn) of the polycarbonate of the present invention is preferably 2000 or more, more preferably 3000 or more, even more preferably 5000 or more, and yet even more preferably 6000 or more. The upper limit of the number average molecular weight is, for example, not more than 100000, preferably not more than 50000, more preferably not more than 30000, even more preferably not more than 10000, yet even more preferably not more than 9000, still even more preferably not more than 8000, and even more preferably not more than 7500. By setting the number average molecular weight to the above-mentioned lower limit or higher, the strength of the obtained molded article tends to be higher, and by setting the number average molecular weight to the above-mentioned upper limit or lower, the melt viscosity decreases, it becomes easier to extract the molded article from a mold when the polycarbonate is molded by injection molding, and there is a tendency for fluidity to be improved and for achieving better injection moldability, which is preferable.

The above-mentioned average molecular weight is measured in accordance with the method described in examples below. In a case where the equipment or the like described in the examples is difficult to procure due to discontinuation or the like, other equipment having equivalent performance and the like can be used (the same applies to the other measurement methods below).

The glass transition temperature (Tg) of the polycarbonate of the present invention is preferably 70° C. or higher, more preferably 100° C. or higher, even more preferably 110° C. or higher, and yet even more preferably 120° C. or higher, and may be 125° C. or higher, 130° C. or higher, or 135° C. or higher. Furthermore, the upper limit of the glass transition temperature is preferably not higher than 190° C., more preferably not higher than 180° C., and even more preferably not higher than 170° C., and may be not higher than 165° C., not higher than 150° C., or not higher than 146° C. By setting the glass transition temperature to 100° C. or higher, it is possible to set the glass transition temperature to a sufficient usage temperature range for a lens or camera. Furthermore, injection moldability is more preferably improved by setting the glass transition temperature to 190° C. or lower.

The glass transition temperature is measured in accordance with the method described in the examples below.

When the polycarbonate of the present invention is molded into a film having a thickness of 0.1 mm, the refractive index measured by the method of JIS-K-7142 is preferably 1.485 or more, more preferably 1.500 or more, even more preferably 1.530 or more, still even more preferably 1.550 or more, and yet even more preferably 1.570 or more. The upper limit of the refractive index is preferably not more than 1.700, and may be not more than 1.650.

The refractive index is measured in accordance with the method described in the examples below.

When the polycarbonate of the present invention is molded into a film having a thickness of 0.1 mm, the Abbe number measured by the method of JIS K 7142 is preferably 23 or more, more preferably 24 or more, and even more preferably 25 or more. The upper limit of the Abbe number is preferably 52 or less, more preferably 35 or less, even more preferably 33 or less, and yet even more preferably 31 or less, and may be 30 or less.

The Abbe number is measured in accordance with the method described in the examples below.

When the polycarbonate of the present invention is molded into a plate piece having a thickness of 3 mm, the total light transmittance measured by the method of JIS-K-7361-1 preferably exceeds 85%, is more preferably 86% or more, and may be 87% or more. The upper limit of the total light transmittance is ideally 100%, but the required performance is sufficiently satisfied even with an upper limit of the total light transmittance of, for example, 99% or less, or even 95% or less, and particularly, even 90% or less.

The total light transmittance is measured in accordance with the method described in the examples below.

When the polycarbonate of the present invention is molded into a plate piece having a thickness of 3 mm, the b value in accordance with JIS K7105 is preferably less than 3.0, more preferably 2.9 or less, even more preferably 2.8 or less, and yet even more preferably 2.7 or less. The lower limit of the b value is ideally 0, but the required performance is sufficiently satisfied even when the lower limit of the b value is, for example, 1.0 or more, or even 2.0 or more, 2.1 or more, and 2.2 or more.

In some cases, phenols that are generated at the time of production, and unreacted diester carbonates remaining may be present as impurities. The phenol content in the polycarbonate is preferably from 0.1 to 3000 ppm (mass ratio), more preferably from 0.1 to 2000 ppm, even more preferably from 1 to 1000 ppm, yet even more preferably from 1 to 800 ppm, still even more preferably from 1 to 500 ppm, and yet even more preferably from 1 to 300 ppm.

Furthermore, the diester carbonate content in the polycarbonate is preferably from 0.1 to 1000 ppm (mass ratio), more preferably from 0.1 to 500 ppm, even more preferably from 1 to 200 ppm, and yet even more preferably from 1 to 100 ppm.

A resin having physical properties according to the purpose can be obtained by adjusting the amount of phenol and diester carbonate contained in the polycarbonate. The content of phenol and diester carbonate can be appropriately adjusted by changing the polycondensation conditions and equipment. The content thereof can also be adjusted by the conditions of the extrusion after polycondensation.

The polycarbonate of the present invention preferably satisfies at least two, and more preferably at least three, of the physical properties selected from the group consisting of the above-mentioned viscosity average molecular weight, number average molecular weight, glass transition temperature, refractive index, Abbe number, total light transmittance, b value, phenol content in the polycarbonate, and diester carbonate content in the polycarbonate, and the polycarbonate of the present invention more preferably satisfies all of these physical properties.

In particular, the polycarbonate of the present invention preferably satisfies the refractive index, Abbe number, and total light transmittance, and more preferably satisfies the refractive index, Abbe number, total light transmittance, and glass transition temperature. In addition to the above, the number average molecular weight is also preferably satisfied.

Preferable aspects of the polycarbonate of the present invention are described below.

<1> An aspect containing from 10 to 90 mol % (preferably from 40 to 60 mol %) of constituent units represented by Formula [I], and from 90 to 10 mol % (preferably from 60 to 40 mol %) of constituent units having a hydrocarbon group containing a cyclic structure (preferably at least one type of constituent unit represented by Formula [II-1], Formula [11-2], or Formula [II-3]), and for which the total of the constituent units represented by Formula [I] and the constituent units having a hydrocarbon group containing a cyclic structure is 90 mol % or more of all the constituent units constituting the polycarbonate.

<2> An aspect for which in Formula [1], $R^3$ is a hydrogen atom, and $R^1$ and $R^2$ are ethyl groups, in Formula [11-1], $R^1$ to $R^{10}$ are hydrogen atoms, and a and b are each independently an integer from 1 to 10, in Formula [II-2], $R^1$ to $R^{20}$ are hydrogen atoms, and c and d are each independently an integer of from 1 to 10, and in Formula [II-3], $R^1$ to $R^{16}$ are hydrogen atoms, and e and f are each independently an integer from 1 to 10.

<3> An aspect satisfying both <1> and <2>.

<4> An aspect for which the number average molecular weight is 6000 or higher for any one of aspects <1> to <3> above.

<5> An aspect in which when any one of the above-mentioned aspects <1> to <4> is formed into a film having a thickness of 0.1 mm, the refractive index measured by the method of JIS-K-7142 is 1.570 or higher, and the Abbe number is 30 or less.

Polycarbonate Production

The polycarbonate of the present invention can be produced by a melt polycondensation method using, as raw materials, a dihydroxy compound represented by Formula [I-1], a dihydroxy compound having a hydrocarbon group containing a cyclic structure, and a diester carbonate. Furthermore, as described above, other dihydroxy compounds and the like may be used in combination. The polycarbonate of the present invention can be produced in the presence of, as a polycondensation catalyst in this reaction, a basic compound catalyst, a transesterification catalyst, or a mixed catalyst of both.

Examples of the diester carbonate include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Of these, diphenyl carbonate is particularly preferable from the perspectives of reactivity and purity. The diester carbonate is preferably used at a ratio from 0.97 to 1.30 mol, more preferably at a ratio of more than 0.98 mol and not more than 1.30 mol, and even more preferably at a ratio from 1.00 to 1.30 mol, per mole of the dihydroxy compound.

Examples of basic compound catalysts include alkali metal compounds, alkaline earth metal compounds, and nitrogen-containing compounds. For details on these basic compound catalysts, refer to the description in paragraphs [0047] to [0049] of WO 2017/175693, the contents of which are incorporated by reference in the present specification.

Salts of zinc, tin, zirconium, and lead are preferably used as the transesterification catalyst, and these can be used alone or in a combination. The transesterification catalyst may also be used in combination with the alkali metal compound described above or an alkaline earth metal compound described above.

For details on these transesterification catalysts, refer to the description of paragraph [0051] of WO 2017/175693, the contents of which are incorporated by reference in the present specification.

These catalysts are preferably used at a ratio from $1 \times 10^{-9}$ to $1 \times 10^{-3}$ mol, and more preferably at a ratio from $1 \times 10^{-7}$ to $1 \times 10^{-4}$ mol, per a total of 1 mol of the dihydroxy compound.

The melt polycondensation method uses the aforementioned raw materials and catalysts to perform melt polycondensation while removing by-products through a transesterification reaction under heating at normal pressure or reduced pressure. The reaction is typically carried out in a multi-stage process of two or more stages. For details, refer to the description of paragraphs [0054] to [0056] of WO 2017/175693, the contents of which are incorporated by reference in the present specification.

In the polycarbonate of the present invention, it is desirable that the content of foreign material be as low as possible, and filtration of the molten raw material and filtration of the catalyst liquid are preferably performed. The mesh of the filter is preferably 5 μm or less, and more preferably 1 μm or less. Furthermore, the produced resin is preferably filtered through a polymer filter. The mesh of the polymer filter is preferably 100 μm or less, and more preferably 30 μm or less. Furthermore, collection of resin pellets must of course be implemented in a low dust environment, and the environment is preferably a class 1000 or lower, and more preferably a class 100 or lower.

Applications

The polycarbonate of the present invention may be used alone or may be used as a polycarbonate composition in which other components are blended. Examples of other components that are blended in the polycarbonate composition include thermoplastic resins other than polycarbonate, antioxidants, release agents, processing stabilizers, UV absorbers, flow modifiers, crystal nucleating agents, tougheners, dyes, antistatic agents, or antibacterial agents, and the like. Examples of thermoplastic resins other than polycarbonate include polycarbonate resins other than the polycarbonate of the present invention, and polyester resins. For specific examples of antioxidants, release agents, processing stabilizers, and UV absorbers, refer to the descriptions of paragraphs [0030] to [0041] of WO 2017/175693 and paragraphs [0078] to [0089] of WO 2018/016516, the contents of which are incorporated by reference herein.

The molded article of the present invention is molded from the polycarbonate of the present invention or a polycarbonate composition containing the polycarbonate.

The molded article is obtained by molding the polycarbonate or polycarbonate composition of the present invention by a known molding method such as extrusion molding or injection molding. The polycarbonate of the present invention is particularly suitable for injection molding.

The molded article of the present invention can be widely used in applications that are used with thermoplastic resins, and particularly polycarbonate resins. The molded article of the present invention is particularly suitable for optical applications. Examples of optical applications include optical lenses and optical films. For details on optical applications, refer to the descriptions of paragraphs [0067] to [0070] of WO 2017/175693 and paragraphs [0090] to [0095] of WO 2018/016516, the contents of which are incorporated by reference in the present specification.

EXAMPLES

The present invention is described in more detail below through examples. The materials, usage amounts, proportions, processing details, processing procedures, and the like described in the examples below may be changed, as appropriate, as long as there is no deviation from the spirit of the present invention. Therefore, the scope of the present invention is not limited to the specific examples described below.

Unless otherwise specified, the following examples were carried out in a 25° C. atmosphere.

Synthesis Example of a Dihydroxy Compound Represented by Formula (a)

A 300 mL round bottom flask was charged with 10.0 g of 1,4-cyclohexanedione (reagent available from Tokyo Chemical Industry Co., Ltd.), 25.1 g of trimethylolpropane (available from Mitsubishi Gas Chemical Co., Inc.), 300 g of toluene (special reagent available from Fujifilm Wako Pure Chemical Corporation), and 0.26 g of methane sulfonic acid (reagent available from Tokyo Chemical Industry Co., Ltd.), and the mixture was heated under normal pressure such that the temperature inside the flask was from 90° C. to 112° C., and a cyclodehydration reaction was carried out. At that temperature, water produced by the reaction was removed from the system to outside the system using a Dean-Stark trap while causing azeotropic distillation of the water with toluene, and the reaction was carried out for 10 hours until the distillation of water stopped. The product in the reaction system after the water had been removed was in slurry form. The reaction slurry liquid was cooled to 25° C., after which the product was filtered, neutralized and washed with caustic soda water, washed with water, and then dried under reduced pressure, and 30.3 g of a dihydroxy compound (hereinafter, referred to as "DSG-a") represented by Formula (a) was obtained (GC purity of 98.4%, isolated yield of 97%).

The reaction scheme is presented below.

[Chemical 21]

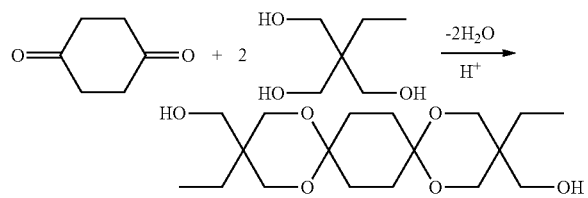

The structure of the DSG-a was identified from various spectra of $^1$HNMR, $^{13}$CNMR, DEPT, H-HCOSY, and HMQC.

[Chemical 22]

$^1$H NMR (500 MHz, DMSO-d6) δ 0.74 (3H×2, t, $CH_3CH_2$-×2), 1.24 (2H×2, q, $CH_3CH_2$-×2), 1.56-1.63 & 1.73-1.81 (4H×2, m, cyclohexane), 3.40 (2H×2, d, $CH_2OH$× 2), 3.48, 3.57 (4H×2, 2d, —$CH_2$—O—C—×4), 4.52 (1H×2, t, OH×2); $^{13}$C NMR (125 MHz, DMSO-d6) δ 6.84, 22.9, 25.7, 30.4, 36.4, 60.2, 63.8, 96.8.

The 625.7 and 30.4 from the $^{13}$C-NMR spectrum were attributed to the four methylene groups of the cyclohexane ring that were non-equivalently observed, two each, from the DEPT135 and HMQC spectra.

In addition, the molecular weight of the DSG-a was measured using LC-MS analysis (electrospray method [ESI positive mode], high resolution mass spectrometry [millimass]). In mass spectrometry according to the electrospray method, molecules are ionized and subjected to mass spectrometry with almost no fragmentation, and therefore information on molecular weight can be obtained, and can be verified as a compositional formula by simultaneously implementing high resolution mass spectrometry. The mass number (molecular weight M+1) of $[M+H]^{30}$, which was protonated while the molecular structure was retained, was 345.22620 ($C_{18}H_{33}O_6$), and therefore the compositional formula of the DSG-a was found to be $C_{18}H_{32}O_6$.

The reaction yield of the DSG-a and the product purity were quantitatively determined with an internal standard method using gas chromatography (instrument name: Agilent 6850 available from Agilent Technologies, Inc.) or high performance liquid chromatography (instrument name: Chromaster, available from Hitachi High-Tech Science Corporation).

NMR (model: JNM-ECA500 available from JEOL Ltd.) was used to determine the structure of the DSG-a. The heavy solvents and measurement frequencies that were used were described in the ascription of each compound.

High resolution mass (millimass, MS) spectrometry of the DSG-a was performed using an LC-MS direct injection method or a Direct Analysis in Real Time (DART) method.

High-performance liquid chromatography (HPLC) instrument: U3000 (available from Thermo Fisher Scientific Inc.)

DART instrument: DART-Os (available from AMR Inc.)

MS instrument: LTQ Orbitrap Discovery (available from Thermo Fisher Scientific Inc.)

Measurement Conditions when Using HPLC

Column: None

Mobile phase: Mixed liquid of 0.1 mass % aqueous formic acid solution: acetonitrile (volume ratio 50:50)

Flow rate: 0.2 mL/min

Sample concentration: 100 mass ppm

Injection volume: 10 μL

MS Measurement Conditions (for LC-MS direct injection)

Ionization method: Positive ESI

Capillary temperature: 300° C.

Capillary voltage: 22 V

Tube lens voltage: 100 V

Measurement Conditions when Using DART

Ion source temperature: 400° C.

MS Measurement Conditions (for DART)

Ionization method: DART

Capillary temperature: 200° C.

Capillary voltage: 35 V

Tube lens voltage: 100 V

Polycarbonate Measurement Method

1) Measurement of Viscosity Average Molecular Weight (Mv):

A solution of 0.5 g/deciliter polycarbonate in dichloromethane was measured using a Ubbelohde capillary viscometer at a temperature of 20° C. to determine the limiting viscosity [η] dL/g with a Huggins constant of 0.45, and the viscosity average molecular weight (Mv) was calculated by applying this [η] to the following Schnell equation expressed below.

$$Mv=\{[\eta]/(1.23\times10^{-4})\}^{1/0.83}$$

2) Number Average Molecular Weight (Mn):

The number average molecular weight (Mn) of the polycarbonate was determined by measuring the nuclear magnetic resonance of protons in a deuterated chloroform solvent using a nuclear magnetic resonance device. The Mn was determined using the integral value of the methylene proton signal adjacent to the molecular terminal and the methylene proton signal adjacent to the carbonate bond.

As the nuclear magnetic resonance device, the model JNM-ECA500 available from JEOL Ltd. was used.

3) Glass Transition Temperature (Tg):

The glass transition temperature was measured using a differential scanning calorimeter (DSC). The measurement conditions were as follows.

Instrument: DSC7000X available from Hitachi High-Tech Science Corporation

Sample amount: 5 mg

Atmosphere: Under a nitrogen gas atmosphere

Temperature increase condition: 10° C./minute

4) Refractive Index (nD):

The polycarbonate was dissolved in methylene chloride and a resin solution with a solid content concentration of 5.3 mass % was produced. A cast film having a thickness of 0.1 mm was produced from this resin solution.

The obtained 0.1 mm thick film was measured using an Abbe refractometer according to the method of JIS-K-7142.

5) Abbe Number (ν):

The polycarbonate was dissolved in methylene chloride and a resin solution with a solid content concentration of 5.3 mass % was produced. A cast film having a thickness of 0.1 mm was produced from this resin solution.

Refractive indexes at wavelengths of 486 nm, 589 nm, and 656 nm at 23° C. were measured for the obtained 0.1 mm thick film using an Abbe refractometer, and the Abbe number was then calculated using the following equation. The refractive index here was measured by the method of JIS-K-7142.

$$\nu=(nD-1)/(nF-nC)$$

nD: refractive index at a wavelength of 589 nm
nC: refractive index at a wavelength of 656 nm
nF: refractive index at a wavelength of 486 nm 5) Total Light Transmittance:

After the polycarbonate was vacuum dried for 4 hours at 120° C., the polycarbonate was injection molded using an injection molding machine (FANUC ROBOSHOT α-S30iA) at a cylinder temperature of 270° C. and a mold temperature of Tg−10° C., and a disk-shaped test plate piece with a diameter of 50 mm and a thickness of 3 mm was obtained.

The obtained 3 mm thick disc-shaped test plate piece was measured using a spectral colorimeter in accordance with the method of JIS-K-7361-1.

The SE2000 model spectral colorimeter available from Nippon Denshoku Industries Co., Ltd. was used.

6) b Value:

After the polycarbonate was vacuum dried for 4 hours at 120° C., the polycarbonate was injection molded using an injection molding machine (FANUC ROBOSHOT α-S30iA) at a cylinder temperature of 270° C. and a mold temperature of Tg−10° C., and a disk-shaped test plate piece with a diameter of 50 mm and a thickness of 3 mm was obtained.

Using this plate piece, the b value was measured in accordance with JIS K7105. As the b value decreases, the yellowness becomes weaker, and the hue becomes better.

The SE2000 model spectral colorimeter available from Nippon Denshoku Industries Co., Ltd. was used to measure the molded plate.

7) Measurement of Phenol (PhOH) and Diphenyl Carbonate (DPC) Amounts in the Polycarbonate An amount of 0.5 g of the polycarbonate obtained in Example 1 described below was dissolved in 50 mL of tetrahydrofuran (THF) to form a sample solution. Calibration curves for phenol and diphenyl carbonate were produced from pure products obtained by distilling commercially available phenol and diphenyl carbonate, respectively, as standard products of phenol and diphenyl carbonate, and 2 μL of the sample solution was quantitatively determined by LC-MS under the following measurement conditions. Note that the detection limit value under these measurement conditions is 0.01 ppm (mass ratio).

LC-MS Measurement Conditions:

Measurement instrument (LC portion): Agilent Infinity 1260 LC System

Column: ZORBAX Eclipse XDB—18 and guard cartridge

Mobile Phase:

A: 0.01 mol/L ammonium acetate aqueous solution

B: methanol solution of 0.01 mol/L ammonium acetate

C: THF

Gradient Program of the Mobile Phase:

As shown in Table 1, a mixture of A to C described above was used as the mobile phase, and the mobile phase was caused to flow through the column for 30 minutes while being exchanged when the time indicated in the time (min) column elapsed.

TABLE 1

| Time (min) | Mobile Phase Composition (vol %) | | |
| --- | --- | --- | --- |
| | A | B | C |
| 0 | 10 | 75 | 15 |
| 10.0 | 9 | 67.5 | 23.5 |
| 10.1 | 0 | 25 | 75 |
| 30.0 | 0 | 25 | 75 |

Flow rate: 0.3 mL/min

Column temperature: 45° C.

Detector: UV (225 nm)

Measurement device (MS portion): Agilent 6120 single quad LCMS System

Ionization Source: ESI

Polarity: Positive (DPC) & Negative (PhOH)

Fragmenter: 70 V

Dry gas: 10 L/min, 350° C.

Nebulizer: 50 psi

Capillary voltage: 3000 V (Positive), 2500 V (Negative)

Measured Ions:

TABLE 2

| Monomer | Ion Species | m/z |
|---------|-------------|-------|
| PhOH | [M − H]⁻ | 93.1 |
| DPC | [M + NH₄]⁺ | 232.1 |

Sample injection volume: 2 L

Example 1

As raw materials, 3.4445 g (10.00 mmol) of DSG-a, 39.4668 g (90.00 mmol) of a dihydroxy compound (also abbreviated as "BPEF" below) represented by Formula (b) below, 21.9576 g (102.50 mmol) of diphenyl carbonate, and 32 μL ($8.0 \times 10^{-7}$ mol, namely, $8.0 \times 10^{-6}$ mol per a total of 1 mole of the dihydroxy compound) of a $2.5 \times 10^{-2}$ mol/L sodium hydrogen carbonate aqueous solution were placed in a 300 mL four-neck flask equipped with a stirrer and distillation device, and the mixture was heated to 180° C. under a 760 mmHg nitrogen atmosphere. Complete dissolution of the raw materials was confirmed after 10 minutes from the startup of heating, and stirring was then performed under the same conditions for 110 minutes. Subsequently, the temperature was increased to 200° C. at a rate of 60° C./hr while simultaneously adjusting the vacuum degree to 200 mmHg. At this time, the startup of distillation of the byproduct phenol was confirmed. Next, the temperature was maintained at 200° C. for 20 minutes and the contents were reacted. The temperature was then increased to 230° C. at a rate of 75° C./hr, and 10 minutes after the temperature increase was completed, the vacuum degree was set to 1 mmHg or less over 1 hour while maintaining that temperature. Subsequently, the temperature was increased to 245° C. at a rate of 60° C./hr, and the mixture was stirred for another 30 minutes. After completion of the reaction, nitrogen was introduced into the reactor to restore normal pressure, and the produced polycarbonate was removed. In addition, in the obtained resin, the phenol (PhOH) content was 100 ppm (mass ratio) and the DPC content was 100 ppm (mass ratio). The physical properties of the obtained resin are summarized in Table 3 below.

Dihydroxy Compound (DSG-a) Represented by Formula (a)

[Chemical 23]

Dihydroxy Compound (BPEF) Represented by Formula (b)

[Chemical 24]

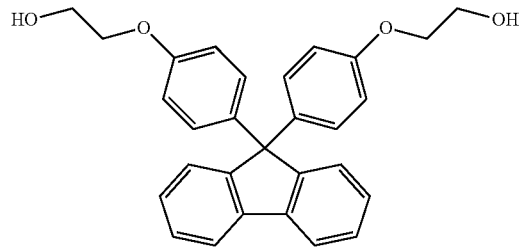

Example 2

A reaction was carried out in the same manner as in Example 1 with the exception that as the raw materials, the amount of DSG-a was changed to 10.3335 g (30.00 mmol) and the amount of BPEF was changed to 30.6964 g (70.00 mmol). The physical properties of the obtained resin are summarized in Table 3 below.

Example 3

A reaction was carried out in the same manner as in Example 1 with the exception that as the raw materials, the amount of DSG-a was changed to 17.2225 g (50.00 mmol) and the amount of BPEF was changed to 21.9260 g (50.00 mmol). The physical properties of the obtained resin are summarized in Table 3 below.

Example 4

A reaction was carried out in the same manner as in Example 1 with the exception that as the raw materials, 17.2225 g (50.00 mmol) of DSG-a, 18.7220 g (50.00 mmol) of a dihydroxy compound (also abbreviated as "BNE" below) represented by Formula (c) below, 21.9576 g (102.50 mmol) of DPC, and 32 L ($8.0 \times 10^{-7}$ mol, namely, $8.0 \times 10^{-6}$ mol per a total of 1 mole of the dihydroxy compound) of a $2.5 \times 10^{-2}$ mol/L sodium hydrogen carbonate aqueous solution were used. The physical properties of the obtained resin are summarized in Table 3 below.

Dihydroxy Compound (BNE) Represented by Formula (c)

[Chemical 25]

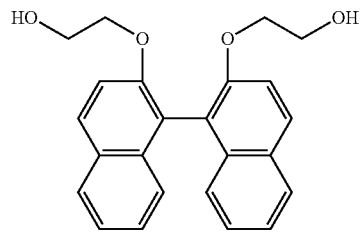

Example 5

A reaction was carried out in the same manner as in Example 1 with the exception that as the raw materials, 17.2225 g (50.00 mmol) of DSG-a, 29.5360 g (50.00 mmol) of a dihydroxy compound (also abbreviated as "BPPEF" below) represented by Formula (d) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^2$ mol/L sodium hydrogen carbonate aqueous solution were used. The physical properties of the obtained resin are summarized in Table 3 below.

Dihydroxy Compound (BPPEF) Represented by Formula (d)

[Chemical 26]

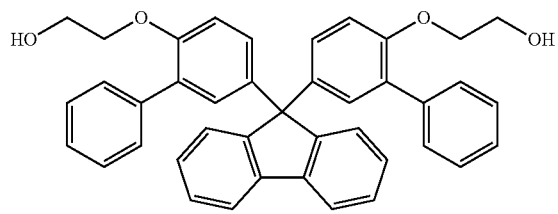

Example 6

A reaction was carried out in the same manner as in Example 1 with the exception that as the raw materials, 17.2225 g (50.00 mmol) of DSG-a, 29.9320 g (50.00 mmol) of a dihydroxy compound (also abbreviated as "BNEF" below) represented by Formula (e) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^2$ mol/L sodium hydrogen carbonate aqueous solution were used. The physical properties of the obtained resin are summarized in Table 3 below.

Dihydroxy Compound (BNEF) Represented by Formula (e)

[Chemical 27]

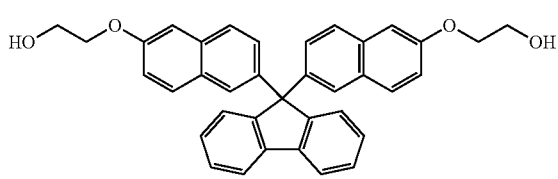

Example 7

A reaction was carried out in the same manner as in Example 1 with the exception that as the raw materials, 17.2225 g (50.00 mmol) of DSG-a, 9.3610 g (25.00 mmol) of BNE, 10.9630 g (25.00 mmol) of BPEF, 21.9576 g (102.50 mmol) of DPC, and 32 μL ($8.0 \times 10^{-7}$ mol, namely, $8.0 \times 10^{-6}$ mol per a total of 1 mole of the dihydroxy compounds) of a $2.5 \times 10^2$ mol/L sodium hydrogen carbonate aqueous solution were used. The physical properties of the obtained resin are summarized in Table 3 below.

Comparative Example 1

A reaction was carried out in the same manner as in Example 3 with the exception that the DSG-a was changed to 15.2190 g (50.00 mmol) of a dihydroxy compound (also abbreviated as "SPG" below) represented by Formula (f) below. The physical properties of the obtained resin are summarized in Table 3 below.

Compound (SPG) Represented by Formula (f)

[Chemical 28]

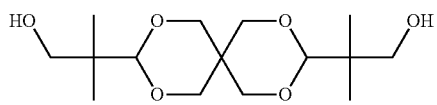

Comparative Example 2

A reaction was carried out in the same manner as in Example 2 with the exception that the DSG-a was changed to 9.1314 g (30.00 mmol) of SPG. The physical properties of the obtained resin are summarized in Table 3 below.

Example 8

A reaction was carried out in the same manner as in Example 1 with the exception that as the raw materials, 17.2225 g (50.00 mmol) of DSG-a, 11.1165 g (50.00 mmol) of a dihydroxy compound (also abbreviated as "D-NDM" below) represented by Formula (g) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^2$ mol/L sodium hydrogen carbonate aqueous solution were used. The physical properties of the obtained resin are summarized in Table 3 below.

Note that D-NDM was synthesized by the method disclosed in Monomer Synthesis Example 1 described in WO 2016/052370.

Compound (SPG) Represented by Formula (g)

Example 9

A reaction was carried out in the same manner as in Example 1 with the exception that as the raw materials, 17.2225 g (50.00 mmol) of DSG-a, 7.2105 g (50.00 mmol) of a dihydroxy compound (also abbreviated as "CHDM" below) represented by Formula (h) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^{-2}$ mol/L sodium hydrogen carbonate aqueous solution were used. The physical properties of the obtained resin are summarized in Table 3 below.

Compound (CHDM) Represented by Formula (h)

[Chemical 30]

Example 10

A reaction was carried out in the same manner as in Example 1 with the exception that as the raw materials, 17.2225 g (50.00 mmol) of DSG-a, 13.1195 g (50.00 mmol) of a dihydroxy compound (also abbreviated as "PCPDM" below) represented by Formula (i) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^2$ mol/L sodium hydrogen carbonate aqueous solution were used. The physical properties of the obtained resin are summarized in Table 3 below.

Compound (PCPDM) Represented by Formula (i)

[Chemical 31]

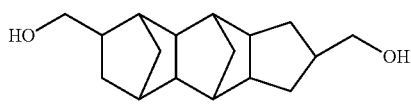

Example 11

A reaction was carried out in the same manner as in Example 1 with the exception that as the raw materials, 17.2225 g (50.00 mmol) of DSG-a, 7.2105 g (50.00 mmol) of a dihydroxy compound (also abbreviated as "TMCB" below) represented by Formula (j) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^{-2}$ mol/L sodium hydrogen carbonate aqueous solution were used. The physical properties of the obtained resin are summarized in Table 3 below.

Compound (TMCB) Represented by Formula (j)

[Chemical 32]

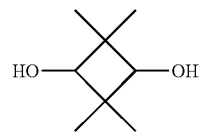

Example 12

A reaction was carried out in the same manner as in Example 1 with the exception that as the raw materials, 17.2225 g (50.00 mmol) of DSG-a, 7.2105 g (50.00 mmol) of a dihydroxy compound (tricyclo[$5.2.1.0^{2,6}$]decane dimethanol, also abbreviated as "TCDDM" below] represented by Formula (k) below, 21.9576 g (102.50 mmol) of DPC, and 32 μL ($8.0 \times 10^{-7}$ mol, namely, $8.0 \times 10^{-6}$ mol per a total of 1 mole of the dihydroxy compound) of a $2.5 \times 10^{-2}$ mol/L sodium hydrogen carbonate aqueous solution were used. The physical properties of the obtained resin are summarized in Table 3 below.

Compound (TCDDM) Represented by Formula (k)

[Chemical 33]

TABLE 3

| | Compositional Ratio | | | | | | | | | | |
|---|---|---|---|---|---|---|---|---|---|---|---|
| | DSG mol % | BPEF mol % | BNE mol % | BPPEF mol % | BNEF mol % | SPG mol % | D-NDM mol % | CHDM mol % | PCPDM mol % | TMCB mol % | TCDDM mol % |
| Example 1 | 10 | 90 | 0 | 0 | 0 | 0 | 0 | 0 | 0 | 0 | 0 |
| Example 2 | 30 | 70 | 0 | 0 | 0 | 0 | 0 | 0 | 0 | 0 | 0 |
| Example 3 | 50 | 50 | 0 | 0 | 0 | 0 | 0 | 0 | 0 | 0 | 0 |
| Example 4 | 50 | 0 | 50 | 0 | 0 | 0 | 0 | 0 | 0 | 0 | 0 |
| Example 5 | 50 | 0 | 0 | 50 | 0 | 0 | 0 | 0 | 0 | 0 | 0 |
| Example 6 | 50 | 0 | 0 | 0 | 50 | 0 | 0 | 0 | 0 | 0 | 0 |
| Example 7 | 50 | 25 | 25 | 0 | 0 | 0 | 0 | 0 | 0 | 0 | 0 |
| Comparative Example 1 | 0 | 50 | 0 | 0 | 0 | 50 | 0 | 0 | 0 | 0 | 0 |
| Comparative Example 2 | 0 | 70 | 0 | 0 | 0 | 30 | 0 | 0 | 0 | 0 | 0 |
| Example 8 | 50 | 0 | 0 | 0 | 0 | 0 | 50 | 0 | 0 | 0 | 0 |
| Example 9 | 50 | 0 | 0 | 0 | 0 | 0 | 0 | 50 | 0 | 0 | 0 |
| Example 10 | 50 | 0 | 0 | 0 | 0 | 0 | 0 | 0 | 50 | 0 | 0 |
| Example 11 | 50 | 0 | 0 | 0 | 0 | 0 | 0 | 0 | 0 | 50 | 0 |
| Example 12 | 50 | 0 | 0 | 0 | 0 | 0 | 0 | 0 | 0 | 0 | 50 |

| | Physical Properties | | | | | | |
|---|---|---|---|---|---|---|---|
| | Mv | Mn | Tg °C. | Refractive Index (nD) | Abbe Number (ν) | Total Light Transmittance % | b value |
| Example 1 | 11900 | 6700 | 143 | 1.628 | 25 | 88 | 2.5 |
| Example 2 | 12100 | 7100 | 140 | 1.603 | 27 | 88 | 2.5 |
| Example 3 | 12400 | 7200 | 137 | 1.578 | 30 | 88 | 2.5 |
| Example 4 | 11600 | 6300 | 121 | 1.587 | 27 | 87 | 2.7 |
| Example 5 | 11300 | 6200 | 144 | 1.597 | 27 | 87 | 2.6 |
| Example 6 | 11800 | 6700 | 160 | 1.610 | 25 | 87 | 2.7 |
| Example 7 | 11800 | 6600 | 141 | 1.588 | 28 | 87 | 2.7 |

TABLE 3-continued

| | | | | | | | |
|---|---|---|---|---|---|---|---|
| Comparative Example 1 | 12200 | 7100 | 128 | 1.568 | 30 | 85 | 3.0 |
| Comparative Example 2 | 11700 | 6400 | 136 | 1.599 | 27 | 85 | 3.0 |
| Example 8 | 12800 | 7700 | 128 | 1.519 | 51 | 90 | 2.4 |
| Example 9 | 12500 | 7500 | 79 | 1.517 | 50 | 90 | 2.3 |
| Example 10 | 11900 | 6800 | 133 | 1.539 | 44 | 90 | 2.2 |
| Example 11 | 12600 | 7500 | 136 | 1.489 | 50 | 90 | 2.4 |
| Example 12 | 12300 | 6900 | 105 | 1.515 | 51 | 90 | 2.4 |

The compositional ratio in the table above indicates the ratio (mol %) of each of the raw materials charged when the total of the raw material dihydroxy compounds is set to 100 mol %.

As is clear from the above results, the polycarbonate of the present invention exhibited a high refractive index while maintaining a superior Abbe number comparable to that of the prior art. In addition, the polycarbonate of the present invention had high heat resistance (Tg), high total light transmittance, and excellent hue (b value).

In particular, Example 3 and Comparative Example 1 differ only in that the dihydroxy compound used as the raw material monomer was DSG-a or SPG, respectively. Furthermore, it is clear that compared to Comparative Example 1, Example 3 exhibited a higher refractive index, higher heat resistance (Tg), higher total light transmittance, and a lower b value. In particular, when the refractive index increases, the Abbe number tends to be inferior, but with the polycarbonate of the present invention, it was possible to increase the refractive index while maintaining an excellent Abbe number, and thus the value of the polycarbonate of the present invention is high. A similar trend was observed between Example 2 and Comparative Example 2.

INDUSTRIAL APPLICABILITY

According to the present invention, a heat resistant polycarbonate having a high Abbe number and excelling in optical properties, and an optical lens and optical film using the same can be obtained. The polycarbonate of the present invention can be inexpensively injection molded with high productivity, and therefore can be used in fields where expensive high Abbe glass lenses are typically used, such as in cameras, telescopes, binoculars, and television projectors, and thus is extremely useful. In addition, since the Abbe number is high, the polycarbonate of the present invention is effective for correcting chromatic aberrations, and improvements in image quality are expected. The polycarbonate of the present invention is particularly suitable for smartphones and tablets equipped with small lens units. Furthermore, according to the present invention, high Abbe aspheric lenses that are technically difficult to be processed as glass lenses can be easily obtained through injection molding, and are extremely useful. The present invention is also extremely useful for correcting partial chromatic aberrations associated with the wider angle needs of cameras in recent years. Furthermore, the polycarbonate of the present invention is useful as a film such as an anti-reflective film.

The invention claimed is:

1. A polycarbonate comprising a constituent unit represented by Formula [I] and constituent unit having a hydrocarbon group containing a cyclic structure:

[Chemical 1]

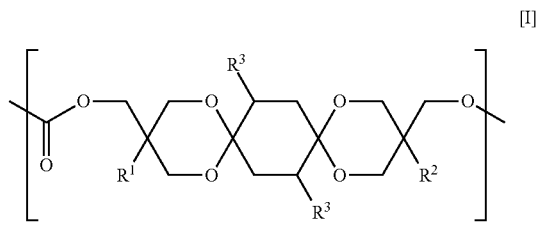

where $R^1$ and $R^2$ each independently denote a hydrocarbon group, and each $R^3$ independently denotes a hydrogen atom, a heteroatom-containing group, a halogen atom-containing group, a linear alkyl group having from 1 to 6 carbon atoms, a branched alkyl group having from 3 to 6 carbon atoms, or a group including an aryl group and having from 6 to 12 carbon atoms.

2. The polycarbonate according to claim 1, wherein the polycarbonate has a number average molecular weight of not less than 6000.

3. The polycarbonate according to claim 1, wherein the constituent unit represented by Formula [I] accounts for from 5 mol % to 95 mol % of all constituent units constituting the polycarbonate.

4. The polycarbonate according to claim 1, wherein the constituent unit having a hydrocarbon group containing a cyclic structure comprises a constituent unit represented by Formula [II]:

[Chemical 2]

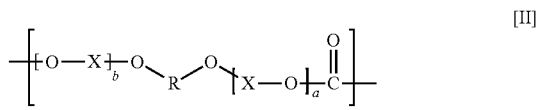

where a and b each independently denote an integer from 0 to 10, X denotes an alkylene group having from 1 to 8 carbon atoms, a cycloalkylene group having 5 to 12 carbon atoms, or an arylene group having from 6 to 20 carbon atoms, and R denotes a hydrocarbon group containing a cyclic structure.

5. The polycarbonate according to claim 4, wherein a and b in Formula [II] are integers from 1 to 10.

6. The polycarbonate according to claim 4, wherein R in the Formula [II] is a structure comprising four or more benzene rings.

7. The polycarbonate according to claim 4, wherein the constituent unit represented by Formula [II] is at least one type of constituent unit represented by Formula [II-1], Formula [II-2], or Formula [II-3]:

[Chemical 3]

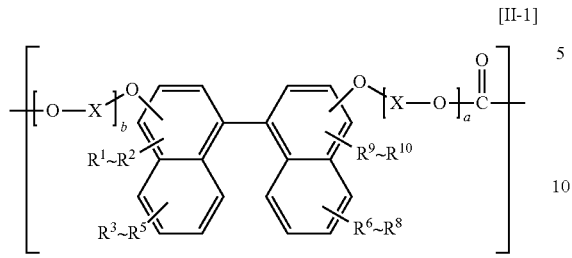

[II-1]

in Formula [II-1], $R^1$ to $R^{10}$ each independently denote a hydrogen atom, a fluorine atom, a chlorine atom, a bromine atom, an iodine atom, an alkyl group having from 1 to 6 carbon atoms, an aryl group having from 6 to 20 carbon atoms, an alkenyl group having from 2 to 6 carbon atoms, an alkoxy group having from 1 to 6 carbon atoms, or an aralkyl group having from 7 to 17 carbon atoms;

X denotes an alkylene group having from 1 to 8 carbon atoms, a cycloalkylene group having from 5 to 12 carbon atoms, or an arylene group having from 6 to 20 carbon atoms; and a and b are each independently an integer from 0 to 10;

[Chemical 4]

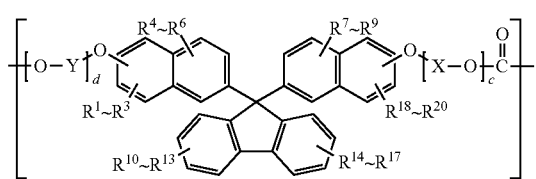

[II-2]

in Formula [II-2], $R^1$ to $R^{20}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Y denotes an alkylene group having from 1 to 8 carbon atoms, a cycloalkylene group having from 5 to 12 carbon atoms, or an arylene group having from 6 to 20 carbon atoms; and c and d are each independently an integer from 0 to 10;

[Chemical 5]

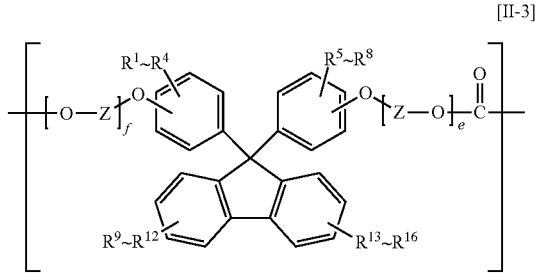

[II-3]

in Formula [II-3], $R^1$ to $R^{16}$ each independently denote a hydrogen atom, a fluorine atom, a chlorine atom, a bromine atom, an iodine atom, an alkyl group having from 1 to 6 carbon atoms, an aryl group having from 6 to 12 carbon atoms, an alkenyl group having from 2 to 6 carbon atoms, an alkoxy group having from 1 to 6 carbon atoms, or an aralkyl group having from 7 to 17 carbon atoms;

Z denotes an alkylene group having from 1 to 8 carbon atoms, a cycloalkylene group having from 5 to 12 carbon atoms, or an arylene group having from 6 to 20 carbon atoms; and e and f are each independently an integer from 0 to 10.

8. The polycarbonate according to claim 1, wherein each $R^3$ in Formula [I] is independently a hydrogen atom or a methyl group.

9. The polycarbonate according to claim 1, wherein $R^1$ and $R^2$ in Formula [I] each independently denote a linear alkyl group having from 1 to 7 carbon atoms, a branched alkyl group having from 3 to 7 carbon atoms, or an aryl group.

10. The polycarbonate according to claim 1, wherein $R^1$ and $R^2$ in Formula [I] are each independently a linear alkyl group having from 1 to 7 carbon atoms or an aryl group.

11. The polycarbonate according to claim 1, wherein $R^3$ in Formula [I] is a hydrogen atom, and $R^1$ and $R^2$ are each independently an ethyl group, a methyl group, or a phenyl group.

12. The polycarbonate according to claim 1, wherein $R^3$ in the Formula [I] is a hydrogen atom, and $R^1$ and $R^2$ are an ethyl group.

13. A molded article comprising the polycarbonate described in claim 1.

14. The molded article according to claim 13, the molded article being an optical lens.

* * * * *

UNITED STATES PATENT AND TRADEMARK OFFICE
CERTIFICATE OF CORRECTION

PATENT NO. : 11,306,180 B2
APPLICATION NO. : 17/040369
DATED : April 19, 2022
INVENTOR(S) : M. Shiratake et al.

Page 1 of 1

It is certified that error appears in the above-identified patent and that said Letters Patent is hereby corrected as shown below:

In the Claims

Column 33 [Chemical 4], (Claim 7, Line 7) [II-2], please change "X" to -- Y -- as shown below:

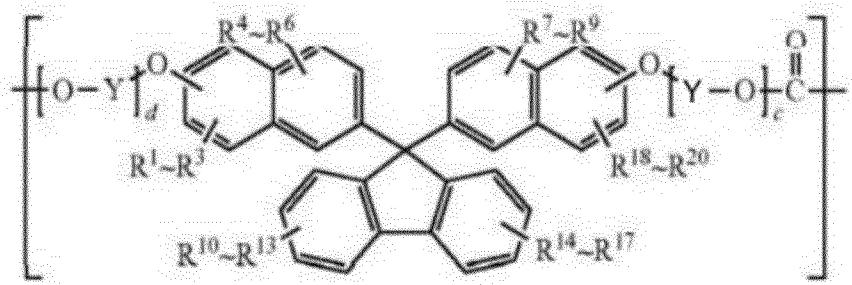

Signed and Sealed this
Eighteenth Day of October, 2022

Katherine Kelly Vidal
*Director of the United States Patent and Trademark Office*